May 9, 1939.　　　　P. R. LEE　　　　2,157,857
THERMOSTAT
Filed Sept. 23, 1936
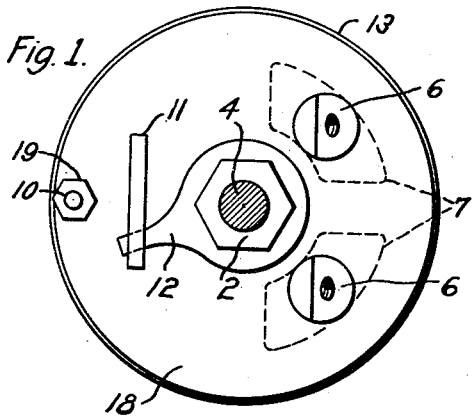
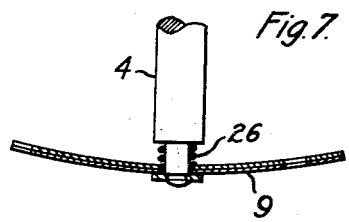
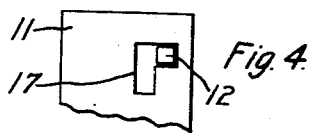
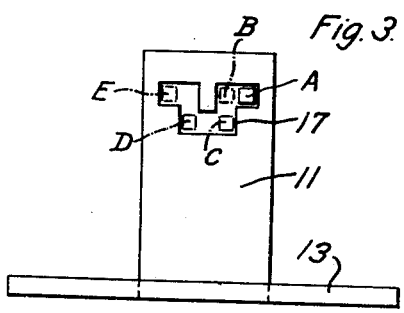
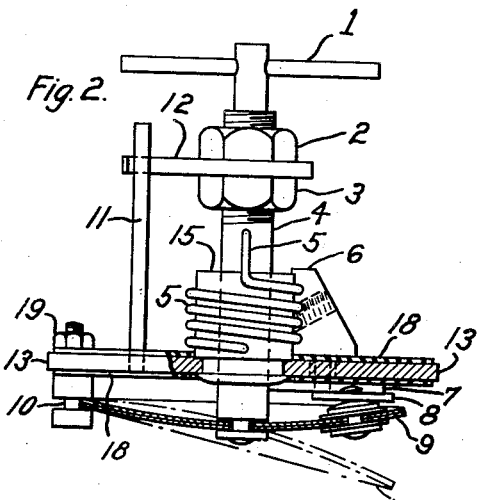
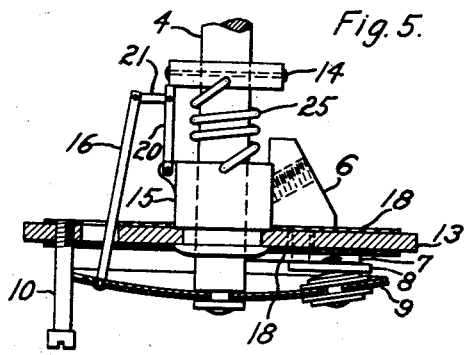
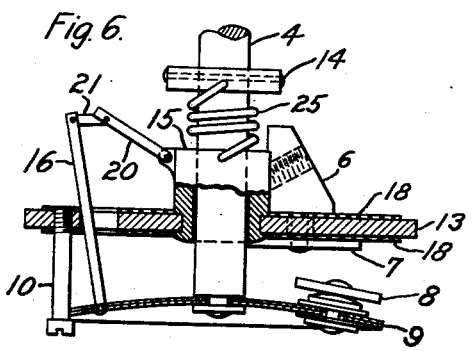
WITNESSES:
Wm. B. Sellers
H. C. Hepler
INVENTOR
Paul R. Lee.
BY W. R. Coley
ATTORNEY Patented May 9, 1939

2,157,857

UNITED STATES PATENT OFFICE 2,157,857

THERMOSTAT

Paul R. Lee, Mansfield, Ohio, assignor to Westinghouse Electric & Manufacturing Company, East Pittsburgh, Pa., a corporation of Pennsylvania Application September 23, 1936, Serial No. 102,059

27 Claims. (Cl. 200—138)

My invention relates to temperature-responsive devices and more particularly to bimetallic thermostats.

An object of my invention is to provide a relatively inexpensive, simple and easily operated bimetallic circuit making or breaking device.

In thermostats known to the prior art, particularly those of the bimetallic type, insofar as I am aware there has been no provision for selectively making the thermostat either automatic or non-automatic in its operation. This is a very desirable feature in that it permits the operator, in connection with the protection of motors, for example, to select whether or not the thermostat shall be automatic in its operation. It is, therefore, an object of my invention to provide a bimetallic thermostat with means to make it either automatically or manually operable at the will of the operator.

Other objects of my invention will either be pointed out specifically in the following description of a preferred form of my invention, or will be apparent from such description.

In practicing my invention, I provide, in combination with a movable bimetallic heat-responsive device, a movable finger with suitable means for rigidly attaching it to a rotatable shaft which is mechanically attached to the heat-responsive device, a stop-plate having a slot cut therein to limit the amount of movement of said heat-responsive device and a spring attached in such a manner as to cause the device to open automatically when the heat source is at a predetermined temperature and requiring the device to be manually closed. I also provide suitable means for causing the device to operate automatically through the complete cycle.

In the accompanying drawing:

Figure 1 is a top plan view of my invention;

Fig. 2 is a side view partially in section;

Figs. 3 and 4 are side views showing different forms of stop-plates;

Fig. 5 is a side view of a modification of my invention, partially in section, with the disk in a closed position, Fig. 6 is a view similar to Fig. 5 except that it shows the disk in an open position; and Fig. 7 is a partial sectional view of a modification of my invention.

Referring first to Figs. 1, 2 and 3 of the drawing, I have illustrated a bimetallic thermostatic switch assembly which includes a base 13 of substantially circular shape which may conveniently be of metal. Adjacent to each face thereof is located a sheet or disk 18 of electric insulating material such as mica. A pair of strip-type contact members 7 and a stop-pin 10 are arranged in general triangular relation against the face of the lower insulating sheet 18, being held thereto by the terminals 6 and nut 19, respectively. An upstanding stop-plate 11 is mechanically attached to the upper face of base 13 at any convenient point and has cut within it a slot of shape substantially as shown in Fig. 3 or Fig. 4. A snap-acting bimetal disk 9, which is preferably of the well-known reversible dished type, is supported centrally by the stud or shaft 4 and is mounted loosely thereon in any suitable manner to provide pivotal action with little, if any, lost motion. Disk 9 is provided with one or more insulatedly-mounted contact members 8 (only one being shown) which are adapted to engage strip contact members 7.

Fig. 7 illustrates a light compression spring 26 which may be placed between the bimetallic disc 9 and the shaft 4. This spring prevents the disc 9 from wobbling when it is in its open or convex position and permits full pivotal action of the disc 9, with no lost motion, about the stop-pin 10 as a fulcrum.

Attached to the top of base 13, and centrally located thereon is a sleeve or housing 15, through which shaft 4 is inserted. About the periphery thereof is a helical spring 5, attached at one end to the housing 15 and at the other end to shaft 4, which biases the shaft clockwise and downward. Shaft 4 is limited, however, in its rotation due to the presence of a finger 12, rigidly attached to the upper portion of shaft 4 and having one end disposed within a slot 17 of stop-plate 11. The finger 12 is attached to shaft 4 between two locknuts 2 and 3, which permits it to be placed in an infinite number of positions. Therefore, the moment of the helical spring 5 may be varied by the rotation of finger 12 with reference to shaft 4 and the retention of the finger within the slot 17. The longitudinal bias of the helical spring 5 and the opening temperature of the disc 9 may be varied and controlled by raising or lowering the position of finger 12 on shaft 4.

When the bimetallic disk is subjected to a temperature sufficiently above normal its curvature changes from concave to convex and acts as a lever with its fulcrum on the stop-pin (10), as shown in dotted lines in Fig. 2. Therefore, as the temperature approaches the set opening value, the contact pressure between the strip contact members 7 and insulatedly-mounted contacts 8 approaches zero and is zero at the instant of snapping. At that instant, when the contact pressure becomes zero, the bias applied to helical spring 5 will rotate shaft 4 and associated finger 12, in a clockwise direction, finger 12 shifting from position A to position B (as shown in Fig. 3). When in this position nothing restricts the vertical movement of the disk and shaft and, therefore, the spring 5 further tends to bias said disk 9 and shaft 4 downward to position where finger 12 occupies position C and then again shaft 4 rotates in a clockwise direction until finger 12 occupies position D. With the disk in this position the contacts 7 and 8 are far apart and if the disk should function normally, that is, reverse its curvature, with a fall in the temperature, the contacts will remain separated. It will be appreciated that the device may be similarly operated manually to open the circuit, namely, handle 1 and shaft 4 may be rotated in a clockwise direction (to shift finger 12 from position A to position B), whereupon spring 5 first causes disc 9 to occupy an open position (shifting finger 12 to position C), and then rotates shaft 12 in a clockwise direction (to shift finger 12 to position D). To reset or close the thermostat it is necessary to manually rotate the shaft 4 in a counter-clockwise direction by means of handle 1, then pull it up and again rotate it in a counter-clockwise direction, resetting finger 12 back in its original position A, as shown in Fig. 3.

It should be noted that the disc 9 is "trip-free" of handle 1, since if the handle is held in position A, the circuit will still be opened by reason of the moving contact on disc 9 being carried away from the fixed contact 7 by movement of the disc 9 when heated to a predetermined degree.

It is to be observed that the thermostat cannot be reset until the disk has cooled sufficiently to return to its original concave position and thus permitting the contacts to become engaged. This is due to the absence of the retaining force furnished by the contact pressure resulting from the engagement of contact members 7 and 8 which is capable of offsetting that of the helical spring. This is a very desirable feature, in that with the use of this device it completely protects a giving piece of apparatus by refusing to function or be forced to function until the temperature has returned to the predetermined safe limit.

It will be understood that, if desired, the bimetallic disc 9 may be employed to close, rather than open, a circuit at the predetermined high temperature.

To make the thermostat operate automatically from an open position, it is only necessary to pull the handle 1 up and turn it slightly clockwise, this then placing finger 12 in position E, as shown in Fig. 3. If the finger 12 should be in position A when the operator desired to change the thermostat from manual to automatic in its operation it would be necessary for the handle 1 to be turned clockwise, permitting finger 12 to go from position A to B to C to D and then up and over to position E. With the finger in this position, the shaft 4 and finger 12 cannot be turned clockwise while the contact pressure goes through zero and, therefore, the thermostat will operate in accordance with the well-known actions disclosed in Patent 1,448,240 to J. A. Spencer.

It will be appreciated that the thermostat may be built to be only manual in its operation. A method preferred by me for this purpose is one using a slot within the stop-plate of a shape substantially as shown in Fig. 4. This has considerable advantage over other possible methods in that it does not permit the thermostat to be accidentally placed in an automatic position and, when so desired, by having the stop-plate removably mounted it is only a simple matter to change the device back to its selective design.

A further modification of my invention is shown in Fig. 5 and Fig. 6, in which the thermostatic device is in general as described above except that it can only be manual in operation. Helical spring 25 is in tension only, attached at one end to a collar 14 which is rigidly attached to shaft 4 and at the other end to housing 15, tending to bias the shaft 4 downwardly. Attached at a point relatively near the edge of disk 9 is a pin 16 which extends upwardly through an opening in base 13. Pivotally attached at the upper end of pin 16 is a link 21 likewise atached to a latch 20 which is hinged at its lower end to housing 15.

When disk 9 is concave in shape, corresponding to a lower temperature, contacts 7 and 8 are engaged and pin 16 is in a position substantially as shown in Fig. 5, latch 20 having its upper end under collar 14 and holding shaft 4 and disk 9 in an upper position. When the temperature has increased sufficiently, disk 9 will snap suddenly into a convex shape taking with it pin 16 and latch 20, substantially as shown in Fig. 6. Helical spring 25 will then bias shaft 4 with disk 9 and its associated parts downwardly. Should the disk return to its concave position, the contacts 7 and 8 will not become engaged, due to the vertical displacement of disk 9, and latch 20 will lay along the side of collar 14.

To reset the thermostat, it is necessary to pull the shaft 4 upwardly, permitting latch 20 to slip under and retain collar 14 in its upper position, it being obvious that the thermostat can only be reset after the disk has returned to a concave position. This is a very desirable feature over the manual reset thermostats known to the prior art, in that it is impossible to force the disk into a concave shape and, therefore, effect engagement of the contacts, before the temperature is low enough to permit the disk to inherently return to its original shape.

Further modifications, including the use of other forms of thermostats now known in the art, may be made in the device embodying my invention without departing from the spirit and scope thereof, and I desire, therefore, that only such limitations shall be placed thereon as are imposed by the prior art or recited in the accompanying claims.

I claim as my invention:

1. In combination with a bimetallic circuit-controlling device, a shaft attached thereto, and a supporting base therefor, a stop-plate attached to said base, a slot of irregular shape cut in said stop-plate, a rotatable finger attached to said shaft, and means comprising the engagement of said finger within said slot on said stop-plate for controlling the operation of said device, and means for manually operating said device.

2. In combination with a bimetallic circuit-controlling device, a supporting base therefor, a bushing attached to said base, a shaft attached to said device, said shaft being inserted through said bushing, means for bodily displacing said device and associated shaft under predetermined conditions, and means comprising a helical spring interposed between the shaft and said device for preventing longitudinal movement between the shaft and said device.

3. In combination with a bimetallic circuit-controlling device, a supporting base therefor, a bushing attached to said base, a shaft attached to said device, said shaft being movably inserted through said bushing, and means comprising a helical spring attached at one end to said shaft and at the other end to said bushing for biasing said shaft longitudinally and rotatably.

4. In combination with a bimetallic circuit-controlling device, a supporting base therefor, a bushing attached to said base, a shaft attached to said device, said shaft being inserted through said bushing, means for displacing said device and associated shaft, said means comprising a helical spring attached at one end to said shaft and at the other end to said bushing for biasing said shaft longitudinally and rotatably, and means for limiting the displacement of said device and associated shaft.

5. In combination with a bimetallic circuit-controlling device, a supporting base therefor, a bushing attached to said base, a shaft attached to said device, said shaft being inserted through said bushing, means for displacing said device and associated shaft, said means comprising a helical spring attached at one end to said shaft and at the other end to said bushing for biasing said shaft longitudinally and rotatably, means for limiting the displacement of said device and associated shaft, and means for resetting said device and associated shaft.

6. In combination with a bimetallic circuit-controlling device, a supporting base, a bushing attached to said base, a stop-plate attached to said base, a slot of irregular shape cut in said stop-plate, a shaft attached to said device, said shaft being inserted through said bushing, a rotatable finger attached to said shaft, means for displacing said device, said means comprising a helical spring attached at one end to said shaft and at the other end to said bushing for biasing said shaft longitudinally and rotationally, and means comprising the engagement of said finger within said slot on said stop-plate for limiting the displacement of said device and associated shaft.

7. In combination with a bimetallic circuit-controlling device, a supporting base, a bushing attached to said base, a stop-plate removably attached to said base, a slot of irregular shape cut within said stop-plate, a shaft attached to said device, said shaft being inserted through said bushing, a rotatable finger attached to said shaft, means for displacing said device, said means comprising a helical spring attached at one end to said shaft and at the other end to said bushing for biasing said shaft longitudinally and rotatably, means comprising the engagement of said finger within said slot on said stop-plate for limiting the displacement of said device and associated shaft, and means for resetting said device and associated shaft.

8. In combination with a bimetallic circuit-controlling device, a supporting base, a bushing attached to said base, a stop-plate removably attached to said base, a slot of irregular shape cut within said stop-plate, a shaft attached to said device, said shaft being inserted through said bushing, a rotatable finger attached to said shaft, means for displacing said device, said means comprising a helical spring attached at one end to said shaft and at the other end to said bushing for biasing said shaft longitudinally and rotatably, means comprising the engagement of said finger within said slot on said stop-plate for limiting the displacement of said device and associated shaft, and means for resetting said device and associated shaft, said means comprising a handle attached to the upper end of said shaft.

9. In combination with a plural-position bimetallic circuit-controlling device normally occupying a certain position, and means for operatively supporting said device, means operative upon said device moving to another position for bodily shifting said device to a position precluding its normal circuit-controlling function even though restored to said normal position.

10. In combination with a plural-position circuit-controlling bimetallic disk normally occupying a certain position corresponding to a predetermined shape of said disk, and means for operatively supporting said disk, means operative upon said device moving to another position, corresponding to a different shape of the disk, for bodily shifting said disk to a position precluding its normal circuit-controlling function even though restored to said predetermined shape.

11. In combination with a plural-position circuit-controlling bimetallic disk normally occupying a certain position corresponding to a predetermined shape of said disk, and means for operatively supporting said disk, means comprising a helical spring operative upon said device moving to another position, corresponding to a different shape of the disk, for bodily shifting said disk to a position precluding its normal circuit-controlling function even though restored to said predetermined shape.

12. In combination with a plural-position circuit-controlling bimetallic disk normally occupying a certain position corresponding to a predetermined shape of said disk, a stop-plate, and means for operatively supporting said disk and stop-plate, a slot of irregular shape cut within said stop-plate, a rotatable finger operatively attached to said disk, means comprising a helical spring operative upon said device moving to another position, corresponding to a different shape of the disk, for bodily shifting said disk to a position precluding its normal circuit-controlling function even though restored to said predetermined shape, means comprising the engagement of said finger within said slot on said stop-plate for limiting the displacement of said disk.

13. In combination with a plural-position circuit-controlling bimetallic disk normally occupying a certain position corresponding to a predetermined shape of said disk, a supporting base, a bushing attached to said base, a shaft attached to said disk and inserted through said bushing, a collar attached to said shaft, means for displacing said device, said means comprising a helical spring attached at one end to said collar and at the other end to said bushing for biasing said shaft longitudinally, and means for resetting said disk and associated shaft.

14. In combination with a plural-position circuit-controlling bimetallic disk normally occupying a certain position corresponding to a predetermined shape of said disk, a supporting base, a bushing attached to said base, a shaft attached to said disk and inserted through said bushing, a collar attached to said shaft, means for displacing said device, said means comprising a helical spring attached at one end to said collar and at the other end to said bushing for biasing said shaft longitudinally, means for limiting the displacement of said disk and associated shaft, and means for resetting said disk and associated shaft.

15. In combination with a plural-position circuit-controlling bimetallic disk normally occupying a certain position corresponding to a predetermined shape of said disk, a supporting base, a bushing attached to said base, a shaft attached to said disk and inserted through said bushing, a collar attached to said shaft, a pin attached to said disk and passing through said base, a latch pivotally attached to said bushing, a link pivotally attached at one end to the movable end of said latch and pivotally attached at its other end to the free end of said pin, means for displacing said device, said means comprising a helical spring attached at one end to said collar and at the other end to said bushing for biasing said shaft longitudinally, means comprising the engagement of said latch under said collar for limiting the displacement of said disk and associated shaft, and means for resetting said disk and associated shaft, said means comprising a handle attached to the upper end of said shaft.

16. In a circuit interrupter, a first contact, a thermally responsive element which changes its shape upon the occurrence of a predetermined condition, a second contact movable by said change in shape of the thermally responsive element, and means for causing relative movement between said first and second contacts upon change in shape of the thermally responsive element in addition to the movement of said second contact by said change in shape.

17. In a circuit interrupter, a first contact, a thermally responsive element which changes its shape upon the occurrence of a predetermined condition, a second contact movable away from said first contact by said change in shape of the thermally responsive element, and means responsive to said change in shape for causing separation of said contacts a distance greater than the movement of said second contact by said change in shape.

18. In a circuit interrupter, a first contact, a thermally responsive element which changes its shape upon the occurrence of a predetermined condition, a second contact movable away from said first contact by said change in shape of the thermally responsive element, and means responsive to said change in shape for causing separation of said contacts a distance greater than the movement of said second contact by said change in shape, said thermally responsive element automatically returning to its initial shape without bringing said contacts into engagement, and means movable to bring said contacts into engagement after return of the thermally responsive element to its initial shape.

19. In a circuit interrupter, a first contact, a thermally responsive element for determining the position of said contact, a second contact cooperative with said first contact in one position thereof, and means for changing the position of one of said contacts with respect to the other under predetermined operating conditions of said interrupter.

20. In a circuit interrupter, a first contact, a thermally responsive element for determining the position of said contact, a second contact cooperative with said first contact in one position thereof, and means for biasing one of said contacts away from the other, said biasing means being rendered operative upon predetermined movement of said thermal responsive element.

21. A device as set forth in claim 16, wherein the thermally responsive element comprises a snap-acting bimetallic plate.

22. In a circuit interrupter, a first contact, a thermally responsive element for determining the position of said contact, a second contact cooperative with said first contact in one position thereof, and means for biasing one of said contacts away from the other, said biasing means being rendered operative upon predetermined movement of said thermal responsive element, said thermally responsive element automatically returning to its initial shape without bringing said contacts into engagement, and means movable to bring said contacts into engagement after return of the thermally responsive element to its initial shape.

23. In a circuit interrupter, a pair of contacts, manually operable means for normally moving one of said contacts into and out of engagement with the other contact, a thermally-responsive element for imparting movement to separate said contacts, and biasing means for imparting additional movement to separate said contacts, said biasing means being responsive to movement of said thermally-responsive element to impart said additional movement to separate said contacts.

24. In a circuit interrupter, a pair of contacts, manually operable means for normally moving one of said contacts into and out of engagement with the other contact, a thermally-responsive element for imparting movement to separate said contacts, and biasing means for imparting additional movement to separate said contacts, said biasing means being responsive to movement of said thermally-responsive element to impart said additional movement to separate said contacts, and said thermally-responsive element being operable to separate said contacts even though said manually operable means may be held to prevent operation of said biasing means.

25. In a circuit interrupter, a pair of contacts, manually operable means for normally moving one of said contacts into and out of engagement with the other contact, a thermally-responsive element for imparting movement to separate said contacts, and biasing means for imparting additional movement to separate said contacts, said biasing means being responsive to movement of said thermally-responsive element to impart said additional movement to separate said contacts, and said thermally-responsive element being automatically operable to partially return said contacts to engaged position after causing separation thereof, and said manually operable means being thereafter movable to complete the return of said contacts to engaged position.

26. In a circuit interrupter, a first contact, a thermally responsive element for determining the position of said contact, a second contact in engagement with said first contact in one position thereof, and means responsive to a sudden change of pressure between said engaged contacts for changing their relative positions to preclude reengagement thereof upon said element returning to the position it occupied just before said sudden change of pressure.

27. In a circuit interrupter, a pair of contacts, a thermally responsive element for imparting movement to separate said contacts, biasing means for imparting additional movement to separate said contacts, and manually operable means for overcoming said biasing means and restoring said element to its contact-engaging position.

PAUL R. LEE.